US007358998B2

(12) United States Patent
Chou et al.

(10) Patent No.: US 7,358,998 B2
(45) Date of Patent: Apr. 15, 2008

(54) IMAGE SWITCHING APPARATUS PROVIDING AN OPTICAL COMPENSATOR

(75) Inventors: Chung-Ling Chou, Taichung (TW); Chun-Ming Chen, Taichung (TW); Hui-Chih Tseng, Taichung (TW); Mu-Yuan Wu, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 739 days.

(21) Appl. No.: 10/883,447

(22) Filed: Jul. 1, 2004

(65) Prior Publication Data

US 2006/0001762 A1 Jan. 5, 2006

(51) Int. Cl.
*H04N 5/225* (2006.01)

(52) U.S. Cl. ...................................................... 348/344

(58) Field of Classification Search ................ 348/344; 359/694, 672–675, 637

See application file for complete search history.

(56) References Cited

U.S. PATENT DOCUMENTS 6,809,772 B1 * 10/2004 Motta et al. ................ 348/341
6,822,802 B2 * 11/2004 Nakano et al. ............. 359/637

* cited by examiner

*Primary Examiner*—Lin Ye
*Assistant Examiner*—Dillon Durnford-Geszvain
(74) *Attorney, Agent, or Firm*—Thomas, Kayden, Horstemeyer & Risley

(57) ABSTRACT

An image switching apparatus for an electronic camera. The electronic camera has a lens, an image sensor and a viewfinder. The image switching apparatus includes a housing, an optical assembly and a reciprocating driving device. The housing is disposed between the lens and the image sensor. The lens is opposite the image sensor and the viewfinder is above the housing. The optical assembly is rotatably and movably disposed in the housing and has a beam splitter and an optical compensator. The beam splitter is connected to the optical compensator at a predetermined included angle. The reciprocating driving device is coupled to the optical assembly to rotate and move the optical assembly between a first position and a second position.

13 Claims, 6 Drawing Sheets

IMAGE SWITCHING APPARATUS PROVIDING AN OPTICAL COMPENSATOR

BACKGROUND OF THE INVENTION

1. Field of the Invention

The present invention relates to an image switching apparatus, and in particular to an image switching apparatus that provides an optical compensator.

2. Description of the Related Art

A digital camera is usually provided with a preview function.

Referring to FIG. 1, a conventional camera 1 includes a lens 11, a fixed beam splitter 12 and an image sensor 13. The lens 11 is composed of multiple lenses. An included angle of 45° exists between the fixed beam splitter 12 and the image sensor 13. The image sensor 13 may be a CCD. As shown in FIG. 1, when the camera 1 receives an input image S1 projected from the lens 11, the input image S1 is also projected on the image sensor 13 and a viewfinder 14 via the fixed beam splitter 12. Namely, the input image S1 is divided into two parts by the fixed beam splitter 12. One part of the input image S1 penetrates the fixed beam splitter 12 and is incident on the image sensor 13 while the other part of the input image S1 is reflected upward by the fixed beam splitter 12 and projected on the viewfinder 14. Accordingly, a user can simultaneously preview and capture the input image S1.

The camera 1, however, has a drawback as follows. Since the input image S1 is divided into two parts by the fixed beam splitter 12, light intensity of the input image S1 projected on and received by the image sensor 13 is reduced, adversely affecting imaging thereof. Specifically, the aforementioned problem becomes worse when environmental light intensity is insufficient.

Referring to FIG. 2, another conventional camera 2 can overcome the drawback of the camera 1. The major difference between the two cameras 2 and 1 is that the camera 2 employs a rotatable beam splitter 12' to replace the fixed beam splitter 12. As shown in FIG. 2, when the rotatable beam splitter 12' rotates toward the image sensor 13 with an included angle of 45° (as shown by dotted portion), an input image S2 projected from the lens 11 is divided into two parts by the rotatable beam splitter 12'. One part of the input image S2 is reflected by the rotatable beam splitter 12' and projected on the viewfinder 14. At this point, the user can preview the input image S2. In another aspect, when the user wants to capture the input image S2, the rotatable beam splitter 12' can be rotated clockwise to the upper portion of the lens 11. At this point, the image sensor 13 can receive the input image S2 with enhanced light intensity without obstruction of the rotatable beam splitter 12'.

Accordingly, in the absence of the rotatable beam splitter 12' between the image sensor 13 and the lens 11, the lens 11 forms an image plane behind the image sensor 13. Namely, the input image S2 received by the image sensor 13 is thus blur.

SUMMARY OF THE INVENTION

Accordingly, an object of the invention is to provide an image switching apparatus for an electronic camera having a lens, an image sensor and a viewfinder. The image switching apparatus comprises a housing, an optical assembly and a reciprocating driving device. The housing is disposed between the lens and the image sensor. The lens is opposite the image sensor and the viewfinder is above the housing. The optical assembly is rotatably and movably disposed in the housing and has a beam splitter and an optical compensator. The beam splitter is connected to the optical compensator at a predetermined included angle. The preferred included angle is the right angle. The reciprocating driving device is coupled to the optical assembly to rotate and move the optical assembly between a first position and a second position. The beam splitter simultaneously faces the lens and viewfinder and tilts to the viewfinder with an included angle of 45° when the optical assembly is in the first position, and the optical compensator simultaneously faces the lens and image sensor and is parallel to the image sensor when the optical assembly is in the second position.

The reciprocating driving device further comprises a linkage and a motor. The linkage is coupled to the optical assembly. The motor is connected to and activates the linkage.

The reciprocating driving device further comprises a deceleration mechanism disposed between the linkage and the motor to govern output rotational speed of the motor.

The linkage further comprises three operating rods.

The image switching apparatus further comprises a rotating plate rotatably connected to the housing and abutting the linkage.

The housing further comprises two curved through holes and the optical assembly further comprises a shaft. The curved through holes are respectively formed on two opposite sidewalls of the housing. The shaft is connected to the beam splitter and optical compensator and is rotatably and movably disposed in the curved through holes. The rotating plate abuts the linkage and is connected to the shaft. The shaft rotates and moves in the curved through holes by means of the linkage and rotating plate.

The image switching apparatus further comprises a first resilient element connected between the housing and the rotating plate.

The image switching apparatus further comprises a second resilient element connected between the shaft and the rotating plate.

The rotating plate further comprises a retardant portion abutting the linkage.

The housing further comprises at least one first positioning portion to position the optical assembly in the first position.

The housing further comprises at least one second positioning portion to position the optical assembly in the second position.

The image switching apparatus further comprises a position sensor disposed in the housing to detect the position of the optical assembly.

The thickness of the optical compensator and horizontal thickness with which the beam splitter tilts to the viewfinder at the included angle of 45° are same. In addition, the refractive index of the optical compensator is substantially the same with the refractive index of the beam splitter.

The optical compensator is a transparent glass panel.

The image sensor is a CCD.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
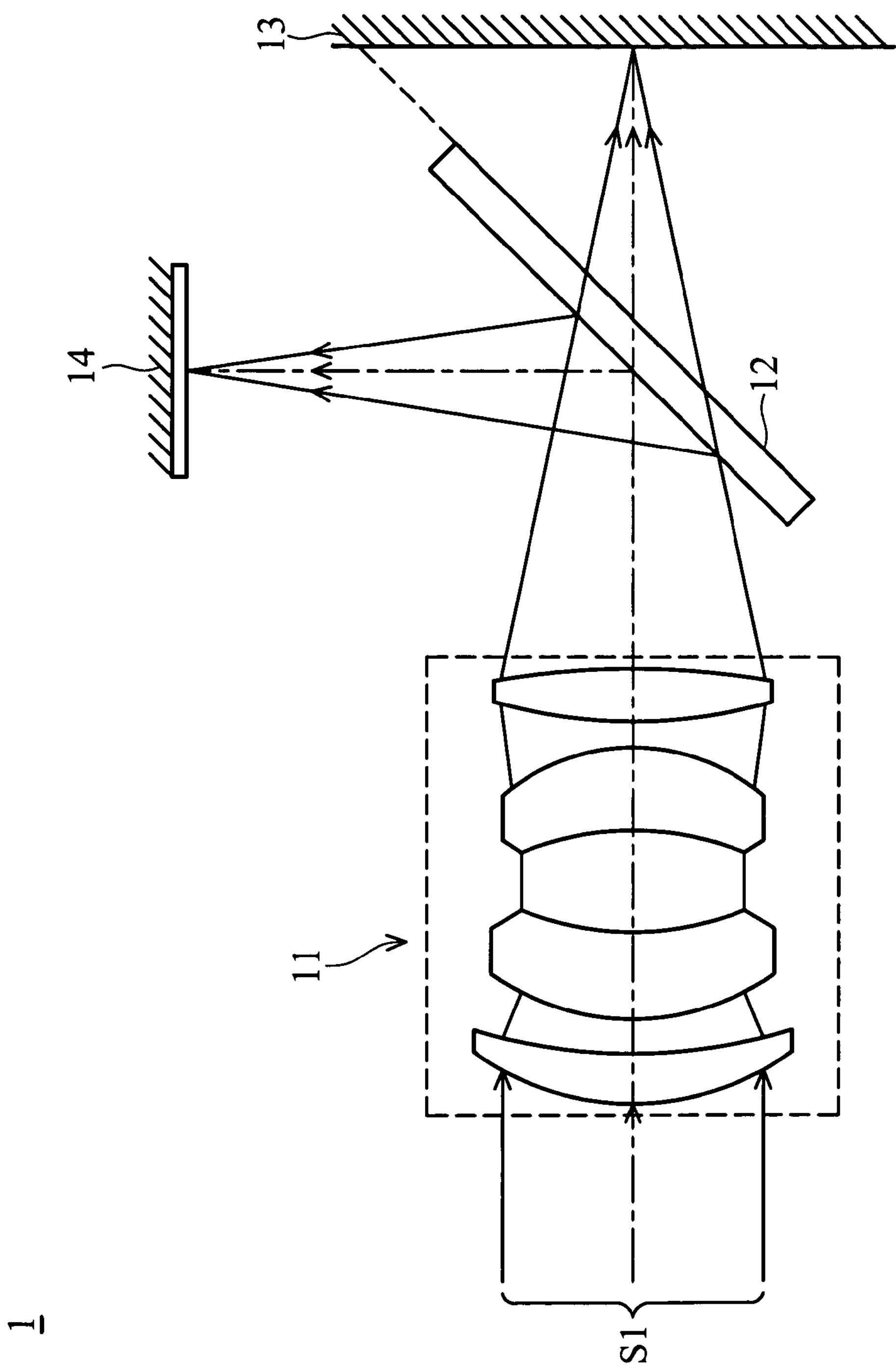
FIG. 1 is a schematic view of a conventional camera for a digital camera.
Figure 2:
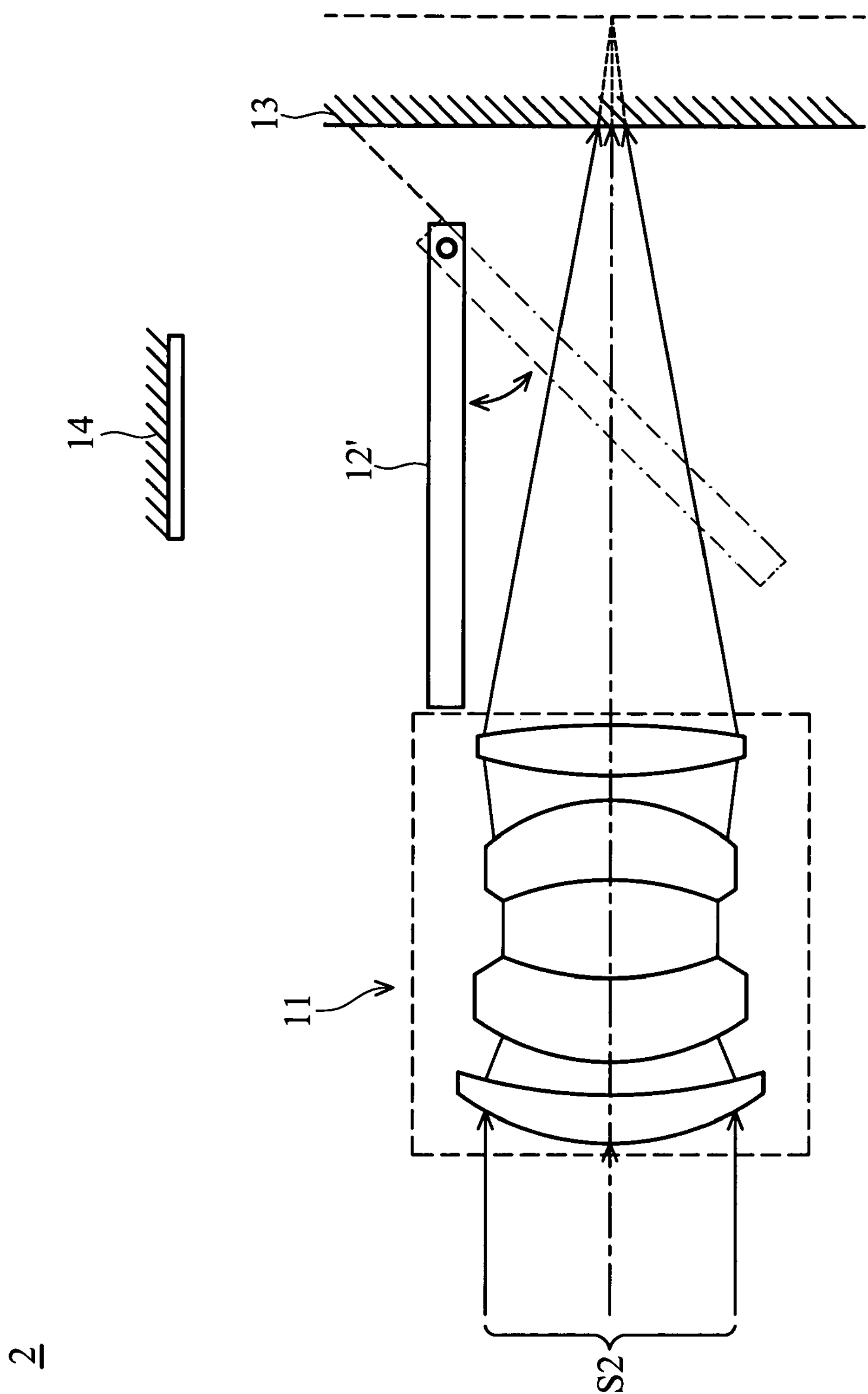
FIG. 2 is a schematic view of another conventional camera for a digital camera.

Referring to FIGS. 3A, 3B, 4A and 4B, the image switching apparatus 100 is applied in an electronic camera having a lens L, an image sensor R and a viewfinder V. The image switching apparatus 100 comprises a housing 110, an optical assembly 120, a reciprocating driving device 130, a rotating plate 140, a first resilient element 150, a second resilient element 160 and a position sensor 170.

Figure 3A:
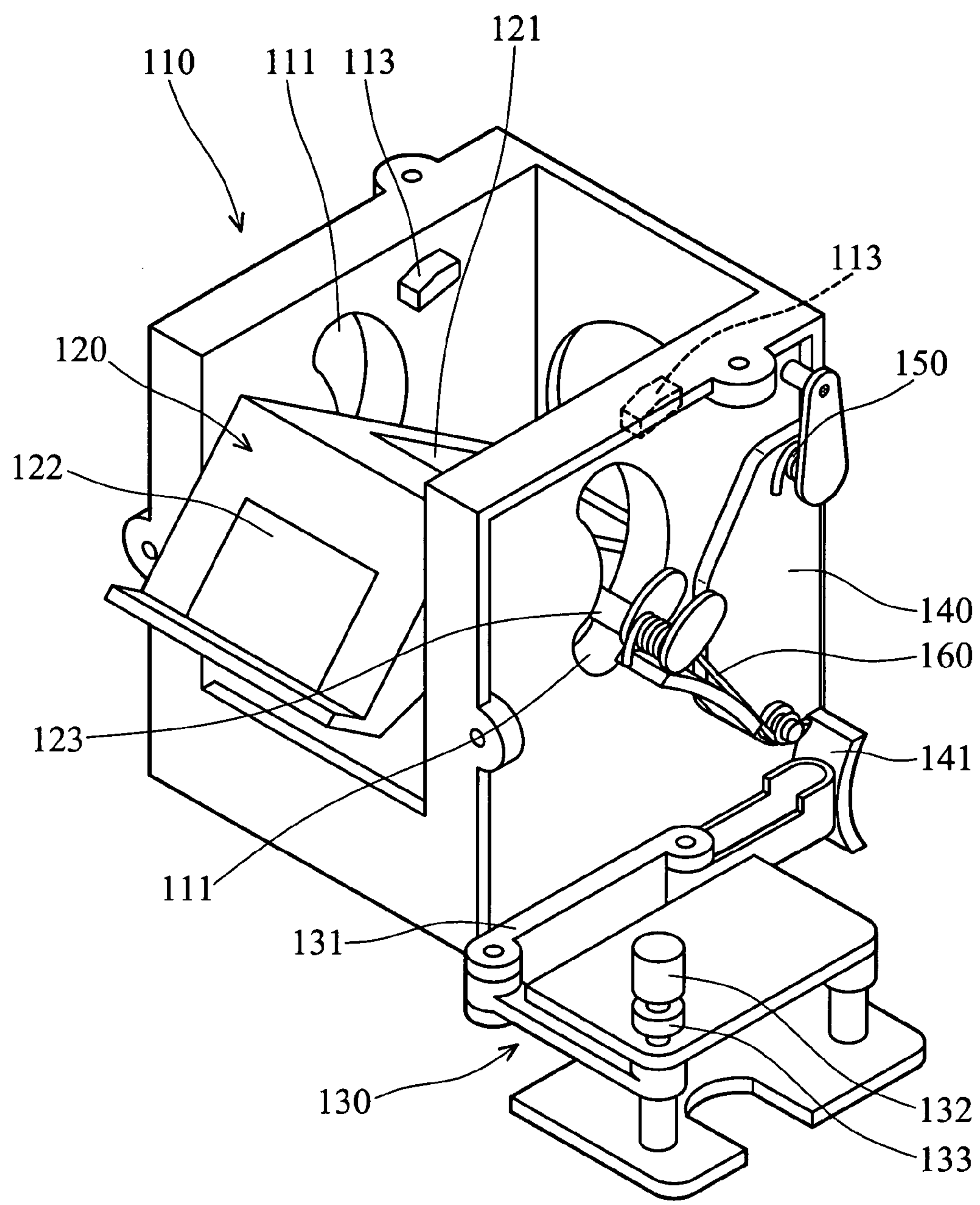
FIG. 3A is a schematic perspective view of the image switching apparatus of the invention.
Figure 3B:
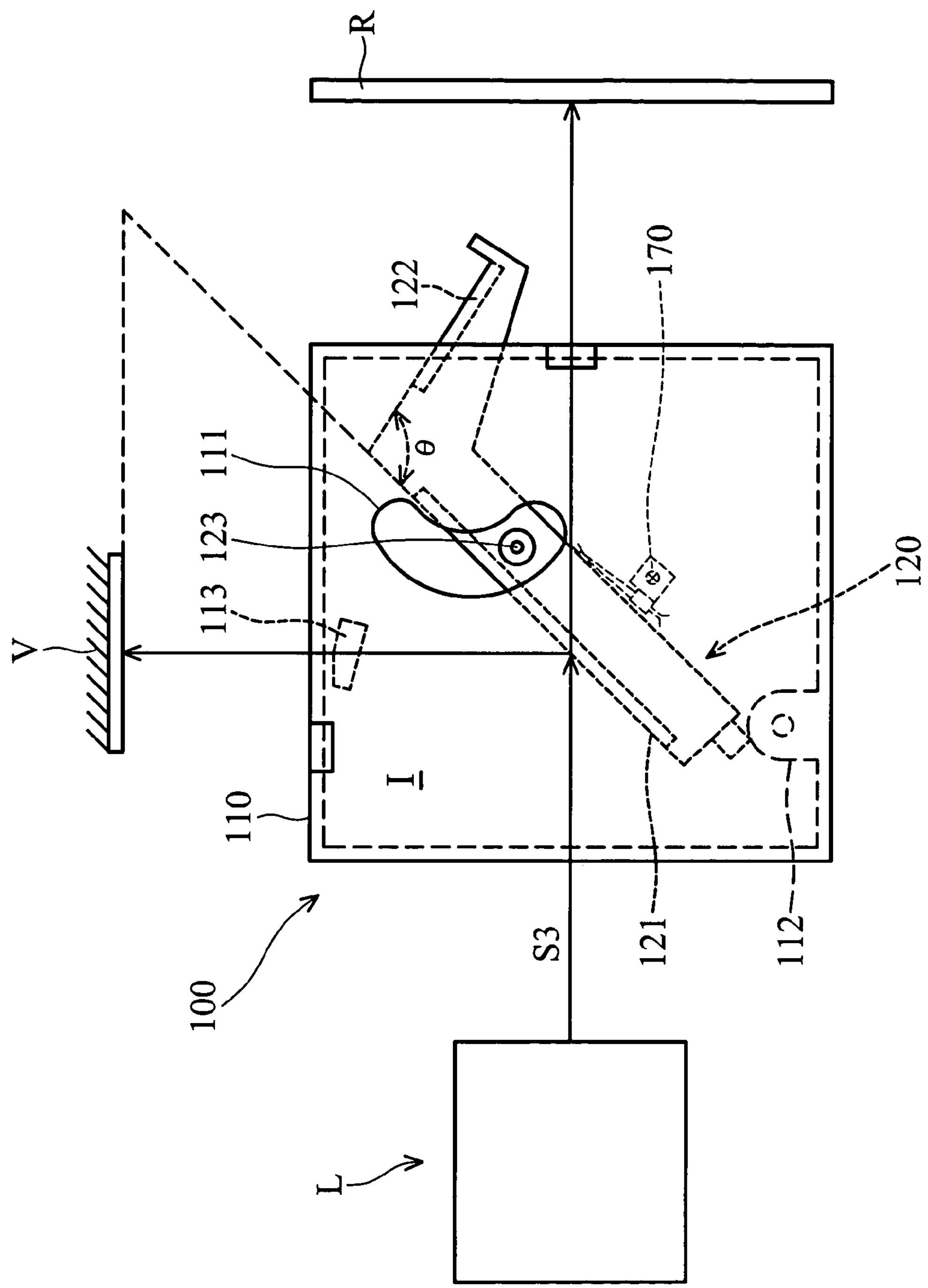
FIG. 3B is a partial side view of the image switching apparatus and electronic camera of the invention.
Figure 4A:
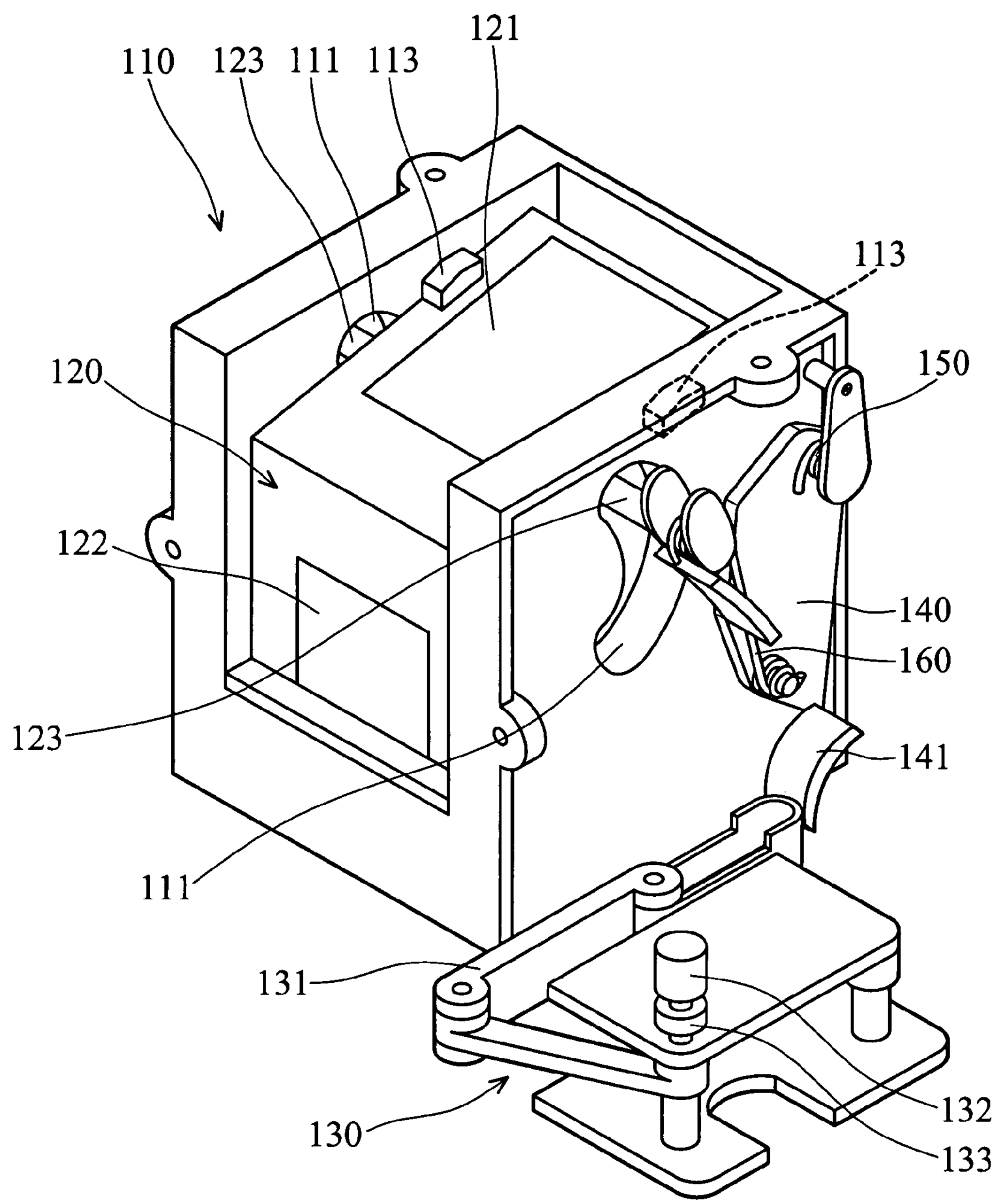
FIG. 4A is another schematic perspective view of the image switching apparatus of the invention.
Figure 4B:
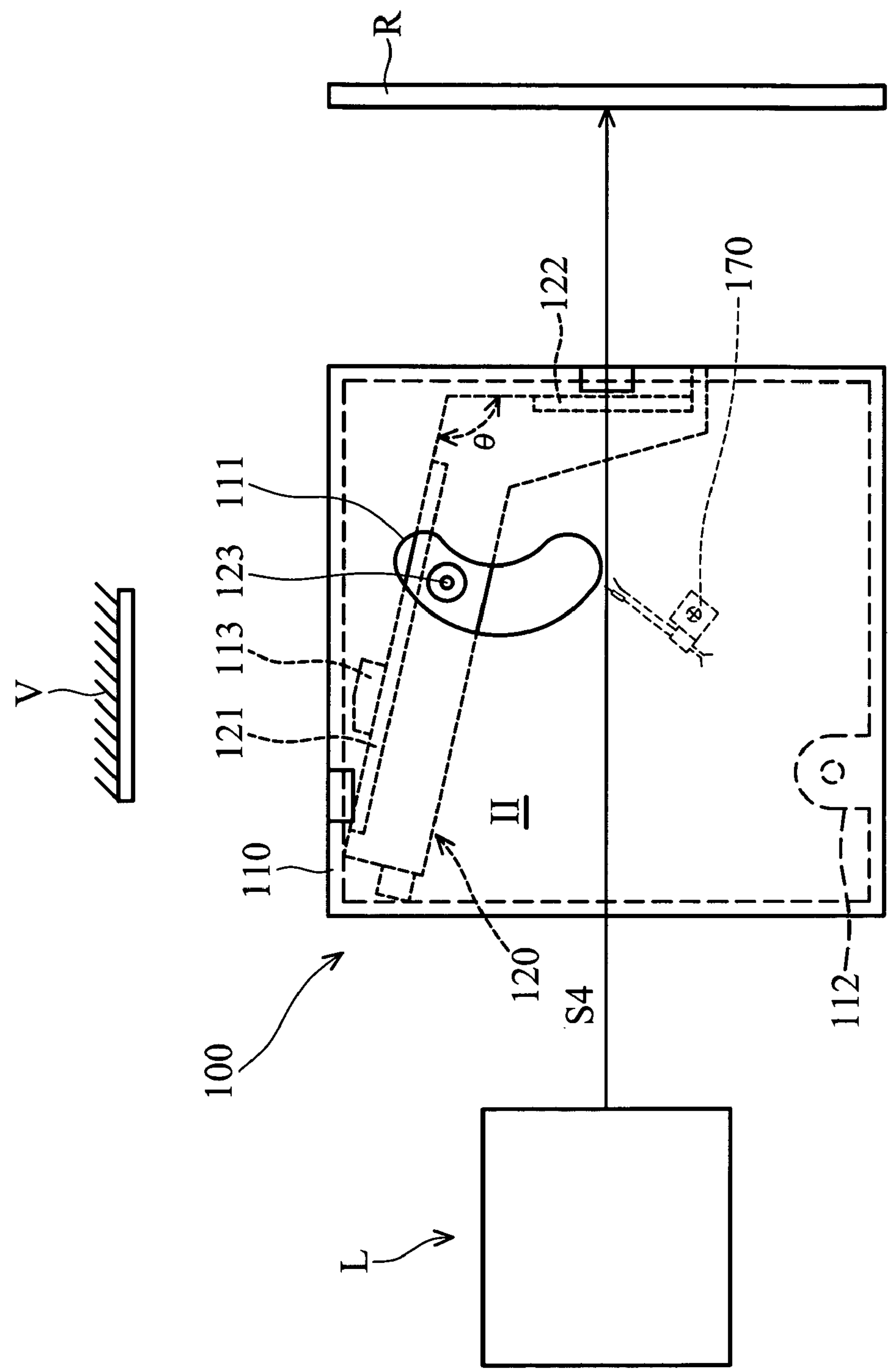
FIG. 4B is another partial side view of the image switching apparatus and electronic camera of the invention.

As shown in FIGS. 3B and 4B, the housing 110 is disposed between the lens L and the image sensor R. Specifically, the lens L is opposite the image sensor R and the viewfinder V is above the housing 110. Additionally, the housing 110 further comprises two curved through holes 111, two first positioning portions 112 and two second positioning portions 113. The curved through holes 111 are respectively formed on two opposite sidewalls of the housing 110. The first positioning portions 112 are formed on the bottom of the housing 110 while the second positioning portions 113 are formed on the upper portion thereof.

The optical assembly 120 is rotatably and movably disposed in the housing 110. Specifically, the optical assembly 120 has a beam splitter 121, an optical compensator 122 and a shaft 123. As shown in FIGS. 3B and 4B, the beam splitter 121 is connected to the optical compensator 122 at a predetermined included angle θ. Namely, the beam splitter 121 tilts to the optical compensator 122 at the predetermined included angle θ. The shaft 123 is connected to the beam splitter 121 and optical compensator 122 and is rotatably and movably disposed in the curved through holes 111 of the housing 110. In this embodiment, the optical compensator 122 is a transparent glass panel. Specifically, the thickness of the optical compensator 122 and horizontal thickness with which the beam splitter 121 tilts to the viewfinder V at an included angle of 45° are same. In addition, the refractive index of the optical compensator 122 is substantially the same with the refractive index of the beam splitter 121.

The reciprocating driving device 130 is coupled to the optical assembly 120. Specifically, the reciprocating driving device 130 comprises a linkage 131, a motor 132 and a deceleration mechanism 133. The deceleration mechanism 133 is disposed between the linkage 131 and the motor 132 to govern output rotational speed of the motor 132. As shown in FIGS. 3A and 4A, the linkage 131 has three operating rods and can reciprocate by means of the motor 132 and deceleration mechanism 133.

The rotating plate 140 is rotatably connected to the housing 110 and abuts the linkage 131. Specifically, the first resilient element 150 is connected between the housing 110 and the rotating plate 140 to provide rotational resilience to the rotating plate 140. The second resilient element 160 is connected between the shaft 123 of the optical assembly 120 and the rotating plate 140 to provide rotational resilience to the shaft 123. Additionally, the rotating plate 140 has a retardant portion 141 abutting the linkage 131. Accordingly, when the motor 132 drives the linkage 131 to reciprocate, the rotating plate 140 rotates between positions as shown in FIGS. 3A and 4A to rotate and move the shaft 123 of the optical assembly 120 in the curved through holes 111. The optical assembly 120 then rotates and moves between a first position I (as shown by FIGS. 3A and 3B) and a second position II (as shown by FIGS. 4A and 4B). Specifically, when the linkage 131 operates from the condition shown in FIG. 3A to that shown in FIG. 4A, the rotating plate 140 automatically rotates upward by the rotational resilience provided by the first resilient element 150 connected between the housing 110 and the rotating plate 140. At this point, the shaft 123 of the optical assembly 120 rotates and moves upward in the curved through holes 111 by upward rotation of the rotating plate 140 and by the rotational resilience provided by the second resilient element 160.

The position sensor 170 is disposed in the housing 110 to detect the position of the optical assembly 120.

In this embodiment, the image sensor R is a CCD.

The following description is directed to operation of the image switching apparatus 100.

During capture and preview of an image S3 using the electronic camera, a trigger mechanism (not shown) disposed on the electronic camera actuates the motor 132. The optical assembly 120 then rotates and moves in the housing 110 with the aforementioned operational steps until the optical assembly 120 abuts the first positioning portions 112 of the housing 110 and contacts the position sensor 170. As shown in FIGS. 3A and 3B, the optical assembly 120 is in the first position I and the position sensor 170 outputs a signal to stop the motor 132 and to switch the electronic camera to a preview condition. At this point, the beam splitter 121 simultaneously faces the lens L and viewfinder V and tilts to the viewfinder V at the included angle of 45°. The image S3 projected from the lens L is divided into two parts by the beam splitter 121. Specifically, one part of the image S3 directly penetrates the beam splitter 121 and is projected on the image sensor R while the other part of the image S3 is reflected by the beam splitter 121 and projected on the viewfinder V, enabling capture and preview of the image S3.

In another aspect, an image can first be previewed with the viewfinder V. A capture button (not shown) disposed on the electronic camera reversely actuates the motor 132. At this point, the optical assembly 120 rotates and moves in the housing 110 with the aforementioned operational steps. Then, the optical assembly 120 no longer contacts the position sensor 170 and the position sensor 170 outputs another signal to switch the electronic camera to a capture condition. When the optical assembly 120 abuts the second positioning portions 113 of the housing 110, as shown in FIGS. 4A and 4B, the optical assembly 120 is in the second position II and operation of the motor 132 is stopped. At this point, the optical compensator 122 of the optical assembly 120 simultaneously faces the lens L and image sensor R and is parallel to the image sensor R. An image S4 projected from the lens L directly penetrates the optical compensator 122 and is formed on the image sensor R. Specifically, since the thickness of the optical compensator 122 and horizontal thickness with which the beam splitter 121 tilts to the viewfinder V at the included angle of 45° are same, the position of the image plane formed by the lens L is not changed. Thus, the image S4 can still be formed on the image sensor R. Accordingly, light intensity of the image S4 is not reduced, thereby ensuring imaging thereof.

Additionally, the capture button can directly capture the image S3. As in capture of the image S4, the image S3 directly penetrates the optical compensator 122 and is projected on the image sensor R.

In conclusion, whether the electronic camera is capturing or previewing an image, the image switching apparatus 100 consistently maintains the position of the focal plane of the lens L. The images projected from the lens L can be always projected onto the image sensor R. Thus, unclear imaging on the image sensor R is prevented.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image switching apparatus for an electronic camera comprising a lens, an image sensor and a viewfinder, comprising:

a housing disposed between the lens and the image sensor, wherein the lens is opposite the image sensor and the viewfinder is above the housing;

an optical assembly rotatably and movably disposed in the housing and comprising a beam splitter and an optical compensator, wherein the beam splitter is connected to the optical compensator at a predetermined included angle; and a reciprocating driving device coupled to the optical assembly to rotate and move the optical assembly between a first position and a second position, wherein the reciprocating driving device comprises a linkage and a motor, the linkage is coupled to the optical assembly and comprises three operating rods, the motor is connected to and activates the linkage, the beam splitter simultaneously faces the lens and viewfinder and tilts to the viewfinder at an included angle of 45° when the optical assembly is in the first position, and the optical compensator simultaneously faces the lens and image sensor and is parallel to the image sensor when the optical assembly is in the second position.

2. The image switching apparatus as claimed in claim 1, wherein the reciprocating driving device further comprises a deceleration mechanism disposed between the linkage and the motor to govern output rotational speed of the motor.

3. The image switching apparatus as claimed in claim 1, further comprising a rotating plate rotatably connected to the housing and abutting the linkage.

4. The image switching apparatus as claimed in claim 3, wherein the housing further comprises two curved through holes and the optical assembly further comprises a shaft, the curved through holes respectively formed on two opposite sidewalls of the housing, the shaft connected to the beam splitter and optical compensator and rotatably and movably disposed in the curved through holes, the rotating plate abutting the linkage and connected to the shaft, and the shaft rotating and moving in the curved through holes by means of the linkage and rotating plate.

5. The image switching apparatus as claimed in claim 4, further comprising a first resilient element connected between the housing and the rotating plate.

6. The image switching apparatus as claimed in claim 4, further comprising a second resilient element connected between the shaft and the rotating plate.

7. The image switching apparatus as claimed in claim 4, wherein the rotating plate further comprises a retardant portion abutting the linkage.

8. The image switching apparatus as claimed in claim 1, wherein the housing further comprises at least one first positioning portion to position the optical assembly in the first position.

9. The image switching apparatus as claimed in claim 1, wherein the housing further comprises at least one second positioning portion to position the optical assembly in the second position.

10. The image switching apparatus as claimed in claim 1, further comprising a position sensor disposed in the housing to detect the position of the optical assembly.

11. The image switching apparatus as claimed in claim 1, wherein the thickness of the optical compensator and horizontal thickness with which the beam splitter tilts to the viewfinder at the included angle of 45° are same.

12. The image switching apparatus as claimed in claim 1, wherein the optical compensator is a transparent glass panel.

13. The image switching apparatus as claimed in claim 1, wherein the image sensor is a CCD.

* * * * *